United States Patent [19]

Farrell et al.

[11] Patent Number: 4,464,443

[45] Date of Patent: * Aug. 7, 1984

[54] DRYING AGENT IN MULTI-LAYER POLYMERIC STRUCTURE

[75] Inventors: Christopher J. Farrell, Arlington Heights; Boh C. Tsai, Rolling Meadows; James A. Wachtel, Buffalo Grove, all of Ill.

[73] Assignee: American Can Company, Greenwich, Conn.

[*] Notice: The portion of the term of this patent subsequent to Oct. 4, 2000 has been disclaimed.

[21] Appl. No.: 538,436

[22] Filed: Oct. 3, 1983

Related U.S. Application Data

[63] Continuation-in-part of Ser. No. 418,199, Sep. 15, 1982, Pat. No. 4,425,410, which is a continuation-in-part of Ser. No. 101,703, Dec. 10, 1979, Pat. No. 4,407,897.

[51] Int. Cl.$^3$ ............................................. B32B 9/00
[52] U.S. Cl. .................... 428/688; 252/194; 206/204; 206/524.5; 426/127; 428/35; 428/518; 428/516; 428/689; 428/702
[58] Field of Search ................. 252/194; 428/516, 35; 206/688, 689, 204, 524.5; 426/127

[56] References Cited

U.S. PATENT DOCUMENTS

| | | | |
|---|---|---|---|
| 2,772,172 | 11/1956 | Carson | 426/415 |
| 3,524,795 | 8/1970 | Peterson et al. | 156/244.11 |
| 3,560,325 | 2/1971 | Sogi et al. | 428/516 |
| 3,882,259 | 5/1975 | Nohara et al. | 428/35 |
| 3,908,070 | 9/1975 | Marzolf | 426/127 |
| 4,041,209 | 8/1977 | Scholle | 428/500 |
| 4,064,296 | 12/1977 | Bornstein et al. | 428/35 |
| 4,239,826 | 12/1980 | Knott et al. | 428/35 |

FOREIGN PATENT DOCUMENTS

1199843 7/1970 United Kingdom.
1384791 2/1973 United Kingdom.

*Primary Examiner*—George F. Lesmes
*Assistant Examiner*—E. Rollins Buffalow
*Attorney, Agent, or Firm*—Paul R. Audet

[57] ABSTRACT

In a multi-layer polymeric structure having an interior oxygen barrier layer of a moisture sensitive polymeric material such as ethylene-vinyl alcohol, drying agents are incorporated in the structure, particularly in a layer or layers proximate to the barrier layer, to limit the moisture content of the barrier layer to maintain barrier properties.

7 Claims, 7 Drawing Figures

DRYING AGENT IN MULTI-LAYER POLYMERIC STRUCTURE

RELATED APPLICATIONS

This application is a continuation-in-part of U.S. patent application Ser. No. 418,199 filed Sept. 15, 1982, now U.S. Pat. No. 4,425,410, which application in turn is a continuation-in-part of U.S. patent application Ser. No. 101,703 filed Dec. 10, 1979, now U.S. Pat. No. 4,407,897.

BACKGROUND

Multi-layer polymeric structures are suitable for flexible and for rigid packages for food. Flexible multi-layer films are used for pouches, bags, and wraps. Thicker multi-layer structures can be formed into containers in the shapes and sizes common for metal cans. Sufficient impermeability to oxygen throughout the expected storage life of the packaged product is a necessity. Most economically practical polymers suitable for packaging purposes are relatively poor oxygen barriers. Consequently, an interior layer of a polymer impermeable to oxygen is desired. Among the favored candidate polymers for barrier layers are ethylene-vinyl alcohol (EVOH) and polyvinyl alcohol (PVOH). Both are excellent oxygen barriers, but both are quite moisture sensitive. Above a relatively modest moisture content, both rapidly begin to lose oxygen barrier quality. There are several opportunities for intrusion of moisture into the barrier layer from the packaged food itself, from storage in moist air and from water vapor present in commercial sterilization processes.

DESCRIPTION OF PREFERRED EMBODIMENTS

Vinyl alcohol polymers and copolymers are excellent oxygen barrier materials.

Substantially fully hydrolyzed ethylene-vinyl alcohol copolymers (EVOH) have rheological properties which allow them to be coextruded with common packaging polymers, thus making EVOH a preferred polymeric material for use as an oxygen barrier layer in rigid and flexible multi-layer polymeric structures for packaging. EVOH is a relatively expensive polymer, costing as much as eight times the cost of polymers commonly used in packaging. The cost of EVOH dictates the use of a very thin layer. A layer of dry EVOH less than one one-thousandth of an inch (1 mil) can provide sufficient protection from oxygen to permit storage of some foods for more than one year.

Figure 1:
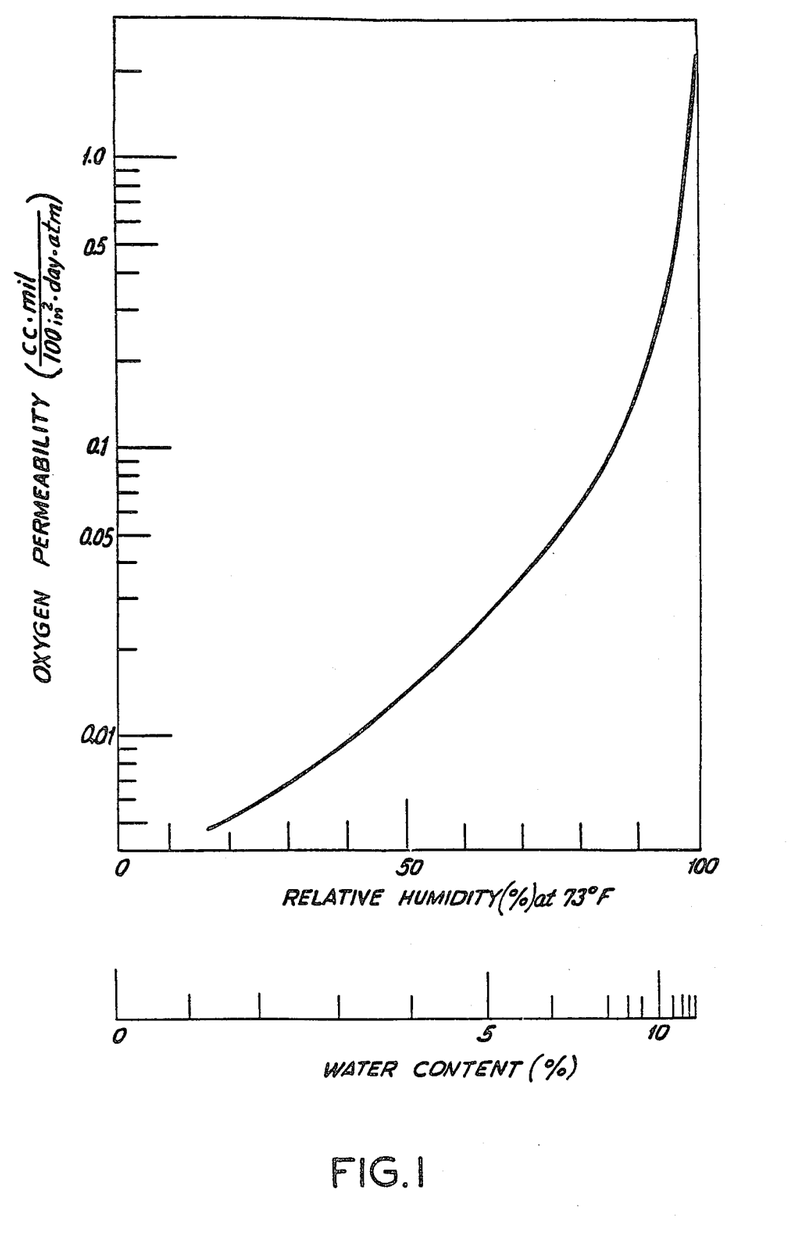
FIG. 1 is a plot of oxygen permeability as a function of water content for EVOH.

EVOH and PVOH are moisture sensitive polymers. The oxygen barrier quality of an EVOH or PVOH layer is degraded by the presence of moisture in the layer. FIG. 1 is a plot of oxygen permeability of EVOH as a function of moisture content. The oxygen permeability is presented in cubic centimeters per day for a film area of 100 square inches at a pressure gradient of one atmosphere $O_2$ per mil of film thickness.

$$(cc.mil)/(100\ in^2.day.atm)$$

The moisture content is presented as the weight percentage of water in the EVOH and is also presented as "water activity". Water activity is most simply defined as the water vapor pressure exerted by a substance divided by the vapor pressure of pure water at the same temperature and pressure. When expressed as a percentage, water activity is often callefd "relative humidity". A strict thermodynamic definition of "water activity" is discussed in such standard texts as "Thermodynamics" by Lewis and Randall (1923). It should be noted that oxygen permeability is plotted on a logarithmic scale in FIG. 1. There is a tenfold increase in permeability between a water content of about 3 percent and 7 percent and over a hundredfold increase between about 3 percent and 12 percent. Thus, a moisture content in excess of about 7 percent causes rapid degradation of the oxygen barrier quality. Food packaging economics favor an oxygen permeability of 0.1 or less, in the above described units. The cost of EVOH dictates the use of thin layers in which very small quantities of water cause a significant increase in water activity. This causes the oxygen permeability to exceed desired limits. EVOH is hydrophilic and extracts moisture from the surroundings.

Figure 2:
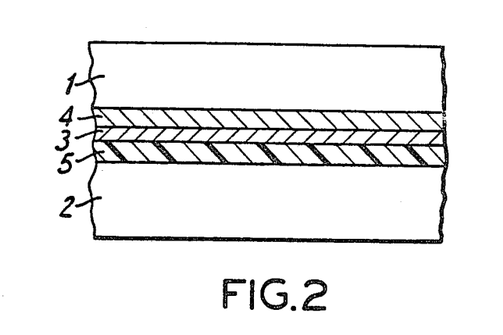
FIG. 2 is an enlarged cross-sectional view of a multi-layer polymeric structure suitable for food packaging.

To protect the EVOH layer from moisture, it is buried between inner and outer layers of moisture barrier polymers such as polyethylene, polypropylene, or blends of the two. FIG. 2 is an enlarged cross-sectional view of a typical multi-layer container wall. The polyolefin structural layers 1 and 2 are adhered to the EVOH oxygen barrier layer 3 by adhesive layers 4 and 5. The adhesive layers 4,5 may be a modified polyolefin such as those sold under the name Plexar by Chemplex Co. of Rolling Meadows, Illinois. Suitable EVOH polymeric materials having vinyl alcohol contents of approximately 70 mole percent are sold under the name EVAL by Kurary Chemical Co., Ltd., and also by Nippon Goshei Co., Ltd. under the names GLD and GLE. Polyolefins are good moisture barriers at and below expectable normal ambient temperatures and thus serve to insulate the interior EVOH layer from moisture. However, at elevated temperatures polyolefins increasingly become more permeable to moisture. Many foods are retorted in the package or container to achieve commercial sterility. The ability to subject a filled food package to retort conditions of 250° F. or more for one half-hour or more in the presence of steam of water (under pressure) is a practical necessity. Retort conditions significantly increase the moisture permeability of polyolefins and allow moisture to enter the EVOH layer. Return of the package to room temperature restores the moisture impermeability of the polyolefin, thereby entrapping the moisture in the EVOH layer. The amount of moisture thus entrapped easily can exceed a water content of about 7 percent (water activity of about 0.9 at room temperature) thereby resulting in an oxygen barrier quality inadequate for many purposes.

Figure 3:
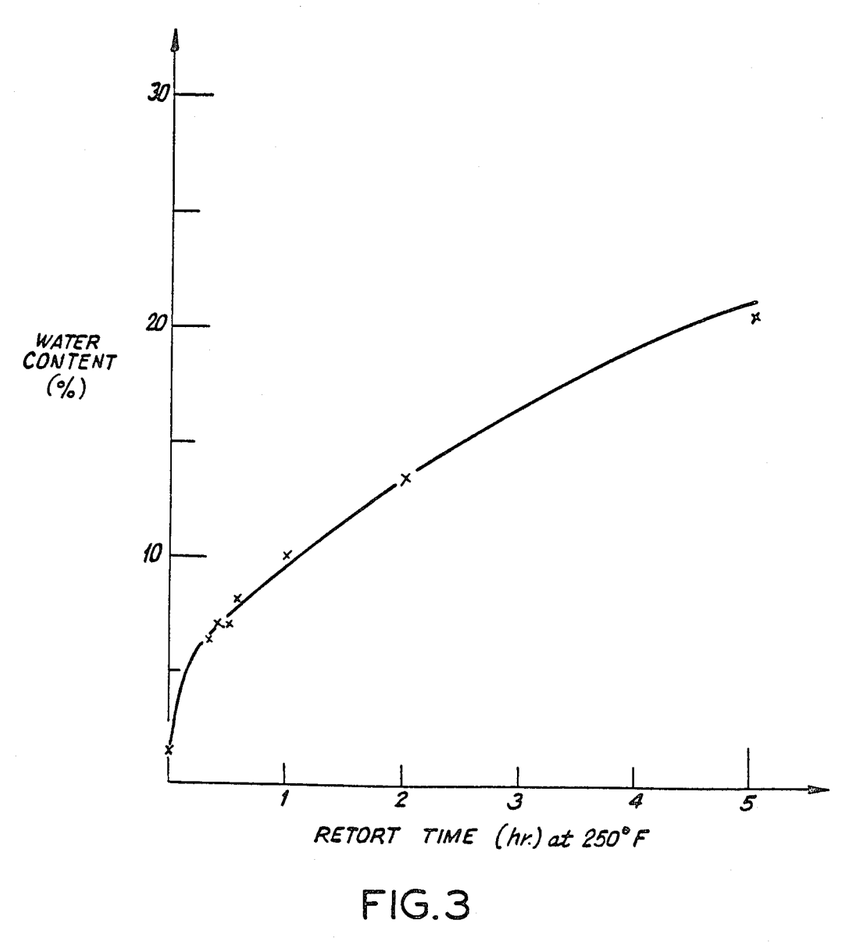
FIG. 3 is a plot of water content as a function of retort time for an EVOH layer in a multi-layer package.

FIG. 3 plots the moisture absorbed by an EVOH layer buried in polyolefin inner and outer layers of a multi-layer rigid container of can shape. The water content is plotted as a function of time in a retort at 250° F. It can be observed that at all retort times above less than one half-hour, the water content is in excess of that which provides an oxygen permeability less than 0.1.

Drying agents, sometimes called desiccants, extract water from their surroundings. We have determined that the incorporation of drying agents, including agents not conventionally recognized as such, in a multi-layer film structure will maintain an adequately low moisture content in a moisture sensitive layer. In particular, we have determined that the incorporation of drying agents in the adhesive layers 4,5 adjacent to the barrier layer 3 of EVOH will preserve the oxygen barrier quality of EVOH by maintaining the water activity of the EVOH at a level below 0.8 or 0.9 (which corresponds to a water content of between 6 and 7 percent) to thereby keep the oxygen permeability below about 0.1.

Figures 4, 6:
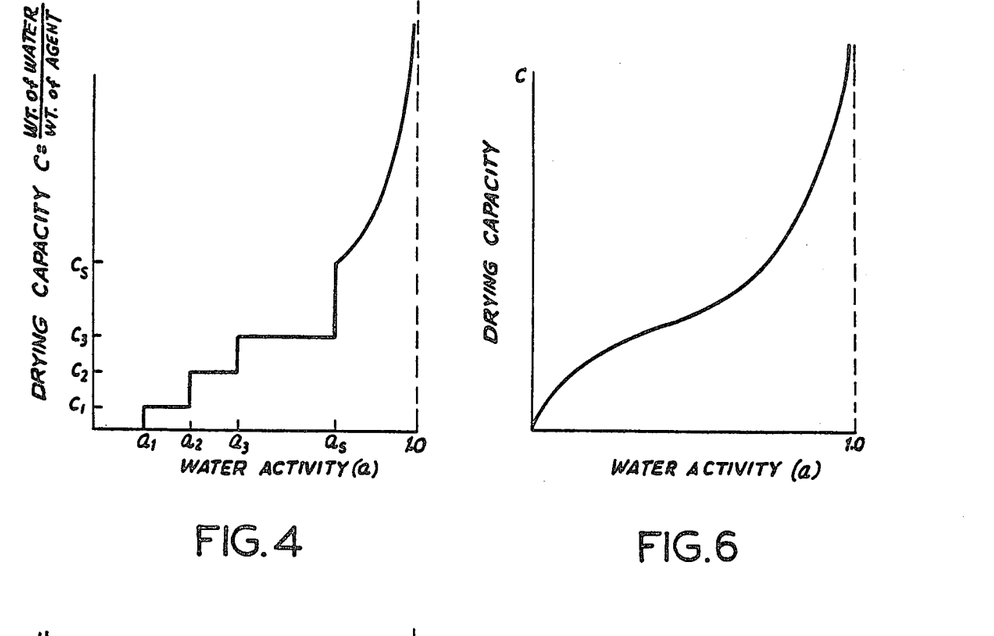
FIG. 4–7 are plots of isotherms for various types of drying agents.

FIG. 4 is a generalized isotherm for hydrate forming drying agents such as sodium phosphate-di-basic and calcium chloride. The drying capacity (c, where c=wt. of water/wt. of agent) of the substance is plotted against the water activity (a) of the surroundings. When the surroundings are air, the water activity is usually expressed as relative humidity (R.H.). No water is taken up until the humidity or water activity reaches a value $a_1$ at which the first hydrate forms. In the case of calcium chloride the first hydrate occurs at less than 2 percent R.H. (a 0.02). Water is taken up until point $c_1$ which represents completion of the first hydrate. No further water is taken up until the humidity or water activity reaches the value $a_2$ where the second hydrate forms and takes up water to the point $c_2$. This process continues through as many hydrates as the substance forms at which point ($a_s$) the substance begins to dissolve and a saturated solution is formed. The saturated solution will then continue to take up water to the limit of saturation ($c_s$) and beyond.

Figure 5:
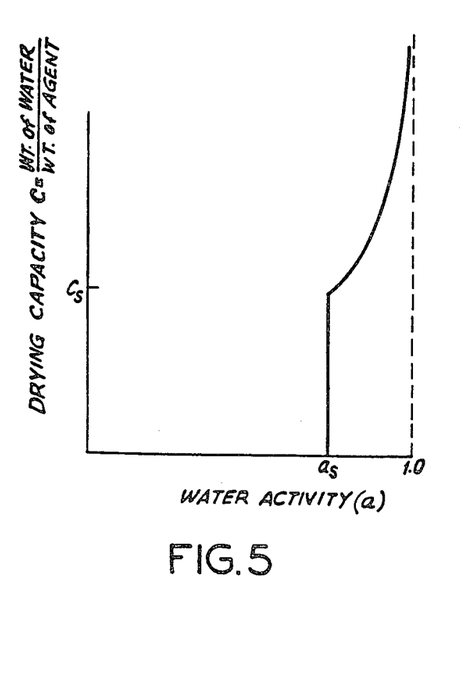

FIG. 5 represents an isotherm of a drying agent which forms no hydrates. Common salt (NaCl) is typical of this class. Common salt will absorb no water at a humidity below about 75 percent. When 75 percent R.H. is reached, a saturated solution is formed which continues to take up water.

FIG. 6 represents an isotherm of a water soluble drying agent such as gelatin which absorbs water at all water activities. At high water activities it dissolves and the solution continues to take up water.

Figure 7:
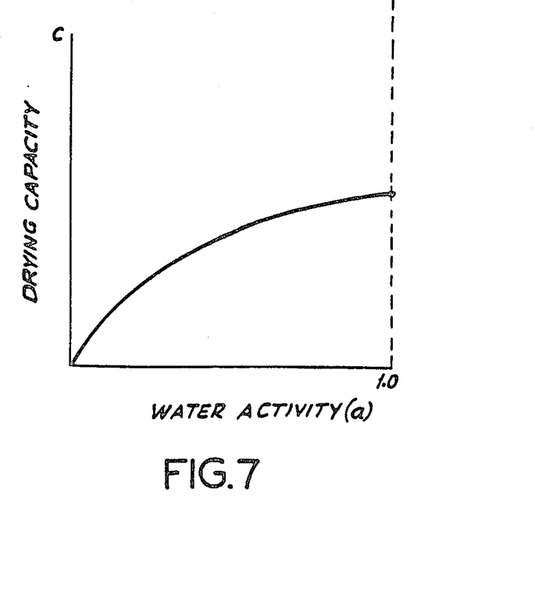

FIG. 7 represents an isotherm of a water insoluble drying agent such as bentonite clay or silica gel which absorbs water at all water activites. Since no solutiion is formed, further adsorption ceases when the intersticies are filled.

From the foregoing description of drying agents with reference to FIGS. 4 through 7, it can be observed that different materials act differently to extract water from their surroundings. Moreover, the absorption isotherm for a particular material depends upon temperature. Most available data are reported for room temperature. A particular material may act quite differently at elevated temperatures such as are encountered during retorting of foods. For example, although sodium phosphate-di-basic has three hydrates at room temperature, it forms none at 250° F.

Table I reports several drying agents which, at adequate loading, resulted in favorable oxygen permeabilities after at least a two hour retort at 250° F. The agents were incorporated in the adhesive layers 4 to 5 of a multi-layer structure. Prior to use, the agents were comminuted in a Waring Blendor and then screened. The agents were compounded by melt blending with the adhesive polymeric material. The permeability data for the drying agents are averages of several determinations. The EVOH used was GLD. The adhesive was Plexar III. The olefin was a high density polyethylene. The particles were ground to a size which was less than the thickness of the layer into which it is to become apart.

TABLE I

| Agent | Weight Percent of Agent in Adhesive | Thickness, mil | | | Permeability |
|---|---|---|---|---|---|
| | | EVOH | Adhesive | Olefin | |
| none | 0 | 1.6 | 2.6 | 15 | 1.6–2.5 |
| CaCl$_2$ | 23.4 | 1.6 | 2.6 | 17 | <0.02 |
| NaCl | 19.5 | 1.7 | 2.4 | 14.7 | 0.08 |
| NH$_4$Cl | 20.2 | 1.7 | 2.8 | 15 | 0.05 |
| Na$_2$HPO$_4$ | 20.7 | 1.6 | 2.6 | 15 | 0.03 |
| Na$_2$HPO$_4$* | 2.5 | 1.7 | 2.5 | 15 | 1.80 |
| Na$_2$HPO$_4$* | 10.5 | 1.7 | 2.5 | 15 | 0.02 |
| Sucrose | 40 | 1.8 | 3.0 | 14.6 | <0.02 |
| Sucrose | 22.5 | 1.8 | 2.8 | 15 | <0.02 |
| Sucrose | 5 | 1.8 | 2.5 | 15 | 0.20 |
| K$_2$CO$_3$ | 18.3 | 1.8 | 2.9 | 14.5 | <0.02 |
| KAl(SO$_4$)$_2$ | 24 | 1.6 | 2.3 | 14.7 | 0.02 |
| MgSO$_4$ | 21.7 | 1.6 | 2.6 | 14.4 | <0.02 |
| KBr** | 17.5 | 1.7 | 2.8 | 14.9 | 0.11 |
| MgCl$_2$ | 20 | 1.8 | 2.5 | 15 | <0.02 |
| (NH$_4$)$_2$SO$_4$ | 20.5 | 1.9 | 2.5 | 15 | 0.12 |
| NaNO$_3$ | 20 | 1.6 | 2.5 | 15 | <0.02 |
| NH$_4$H$_2$PO$_4$ | 25.2 | 1.6 | 2.7 | 14.7 | 0.11 |
| NaCl + NH$_4$Cl | 10,10 | 1.7 | 2.7 | 15 | 0.03 |
| Na$_2$HPO$_4$ + NH$_4$Cl | 10, 10 | 1.9 | 2.5 | 15 | <0.02 |

*3 hr. retort at 250° F.
**2.25 hr. retort at 250° F.

Table II reports several other candidate materials which were not as effective as those in Table I. The structures were otherwise similar to those of Table I.

TABLE II

| Agent | Weight Percent Agent in Adhesive | Thickness, mil | | | Oxygen Permeability |
|---|---|---|---|---|---|
| | | EVOH | Adhesive | Olefin | |
| CaO | 15 | 1.6 | 2.8 | 14.8 | 0.84 |
| KNO$_3$ | 20.8 | 1.65 | 2.5 | 15 | 0.35 |
| CaSO$_4$ | 24.6 | 1.5 | 2.6 | 14.8 | 2.4 |
| molecular sieve (Linde 4A) | 20 | 1.6 | 2.7 | 14.6 | 1.35 |
| bentonite clay | 20 | 1.7 | 2.8 | 14.8 | 0.51 |
| Na$_2$SO$_4$ | 20.6 | 1.6 | 2.5 | 14.6 | 0.99 |

Some experimentation has been conducted with polyvinyl alcohol (PVOH). PVOH has a curve of oxygen permeability as a function of water activity which differs from that for EVOH (compare with FIG. 1 for EVOH). The oxygen permeability of PVOH increases rapidly at water activity above 0.6. Since glycerin is often used as a plasticizer in PVOH, and since glycerin affects that curve, drying agents should be selected which result in a water activity somewhat below 0.6. In a structure similar to those of Table I, 17 percent K$_2$CO$_3$ provided an oxygen permeability below 0.02, whereas PVOH alone had a permeability of 1.7 or higher.

A test was run using Dow Saranex brand multi-layer film including a 0.8 mil inner layer of Saran (vinylidine chloride-vinyl chloride copolymer) with and without retorting at 250° F. for 1.25 hours and with and without sucrose (the drying agent) in the adhesive layers. The outer layers were each 15 mil HDPE. The adhesive layer was 2.6 mils thick. The results are tabulated below:

TABLE III

| | Oxygen Permeability | |
|---|---|---|
| | non-retorted | retorted |
| without sucrose | 0.23 | 0.80 |
| with sucrose | 0.20 | 0.23 |

From Table III, it can be seen that the inclusion of sucrose as the drying agent provided a permeability after retorting as low as before retorting. Saran is not as effective an oxygen barrier as is EVOH.

Desirable drying agents should have sufficient drying capacity (c) at the water activity above which EVOH loses its oxygen barrier quality. Potassium nitrate is an example of a material which has no drying capacity at a water activity below about 0.85 (see FIG. 1). Therefore, even the use of large quantities of these materials will not provide adequate barrier properties of the multilayer structure. Further, desirable drying agents should have sufficient drying capacity to protect the EVOH at reasonable quantities or loadings of the agent. Molecular sieves, calcium sulphate (Drierite) and bentonite clay are examples of candidate materials which, at reasonble loadings, result in relatively high oxygen permeability. Still further, desirable drying agents generally should have more drying capacity at higher water activities than at lower water activities to avoid premature exhaustion. Calcium oxide is as active at 0.01 (water activity) as it is at 0.9 and therefore soon exhausts its drying capacity.

Sucrose at 5 percent and sodium phosphate-di-basic at 2.5 percent are examples of insufficient loading with agents which are effective at higher loadings (Table I).

Many sugars are effective drying agents for multilayer structures because they have high drying capacity at a water activity which preserves the oxygen barrier quality of EVOH. Some sugars, such as sucrose, galactose, glucose and maltose, are more effective after heating. For example, sucrose when heated to 350° F. for up to 40 minutes becomes effective. Such heating occurs during melt blending with the polymer.

Considerations in selection of drying agents include the ability to compound the drying agent with the polymer and to process the compound at the temperature dictated by the polymer. Calcium chloride, while very effective as a drying agent, is difficult to process because it normally contains at least the first hydrate which forms below 2 percent R.H. When the polymer is extruded or otherwise melt processed, the water of hydration is driven off and causes bubbles to form in the polymer.

The quantity of drying agent required is in part dictated by the need to have the drying agent still active after retorting. Too small a quantity may exhaust its drying capacity. Generally, drying agents are less expensive than the polymer with which they are compounded which encourages high loading of the polymer with agent. However, excessive loading may cause various problems such as interference with the adhesion of the polymer to the other layers.

Studies were made comparing identical rigid multilayer polyolefin containers having a 2.0 mil EVOH buried layer where one group of containers was retorted and the other not. After the containers reached moisture equilibrium, the oxygen permeability was measured. The oxygen permeability of those having a history of retorting was higher. This leads to the conclusion that the properties of EVOH are not entirely restored by extracting moisture. Thus, it appears that it is more desirable to prevent the intrusion of moisture into the EVOH during retorting than to extract the moisture subsequently. It can be concluded that drying agents which are active under retort conditions have advantages. Potassium carbonate, sodium nitrate and ammonium chloride are examples of agents which are active during retorting.

The term "drying agent" includes mixtures of two or more agents and includes mixtures of agents in which one member is more active during retorting than the other(s). Some mixtures have demonstrated better performance than do the components of the mixture separately (see Table I).

Rigid containers comprising inner and outer layers of a blend of polypropylene and polyethylene, adhesive layers of Plexar (modified polyolefin) and an innermost barrier layer of EVOH were formed in the shape of cans and a metal end was double seamed on the open end by conventional canning techniques. The containers were retorted for 2 hours at 250° F. The containers were stored at room temperature with 100 percent R.H. inside and 75 percent outside. Those containers having drying agents in the adhesive layer showed superior oxygen barrier after storage. Drying agents are desirable even for containers not subject to retorting. Containers without drying agents, when stored under the above conditions, show a threefold increase in permeability after 100 days, whereas those having drying agents show no increase.

The structural layers outside the barrier and adhesive layers serve as moisture barriers. Where the structural layers are relatively thick (polyolefin layer about 15 mils) the rate of moisture transmission is low, lessening the demands made upon the drying agent. Consequently, there is a wide range of adequate drying agent materials.

The thinner structural layers used in films, pouches, or bags transmit more moisture and, therefore, impose greater demands upon the drying agent. For non-retorted thin packages, the drying agents should have a relatively high drying capacity in the range from about 0.5 to 0.8 water activity. Sodium chloride, sodium phosphate-di-basic and ammonium chloride are good choices. For thin retorted packages, a drying agent which is relatively inactive under retort conditions, but has high drying capacity subsequent to retorting is desired. Sodium phosphate-di-basic is effective because it exhibits no hydrates at 250° F. but forms hydrates at room temperature. (See FIG. 4.) Although the drying agents have been employed in the adhesive layers adjacent to the barrier layer, it is apparent that the layer containing the drying agent can be separated from the barrier layer by an intervening layer if that intervening layer is thin enough to allow moisture passage, or if that layer is a moisture permeable material such as nylon.

As mentioned above, the drying agent does not have to be in a layer proximate to the barrier layer, but may be in the barrier layer itself or may be in a structural layer or other layer which is not proximate to the barrier layer. Thus, for example, 3-layer polymeric structures were prepared consisting of an exterior structural layer of high density polyethylene (15 mils in thickness), an interior layer of ethylene-vinyl alcohol (2 mils), and an exterior layer of high density polyethylene (15 mils). In one such structure, the ethylene-vinyl alcohol moisture sensitive barrier layer was modified to consist of a mixture of 90% by weight ethylene-vinyl alcohol and ten percent by weight of sodium phosphate-di-basic ($Na_2HPO_4$), a drying agent which forms hydrates and which is illustrative of a class of drying agents whose drying capacity vs. water activity is illustrated in FIG. 4. The multi-layer structure was retorted at 250° F. for two hours, cooled for one day at conditions of room temperature and humidity and the oxygen permeability was then measured. The oxygen permeability in cubic centimeters per day for a film area of 100 square inches at a pressure gradient of one atmosphere oxygen per mil of film thickness was 0.06. The oxygen permeability of a control laminate having no sodium phosphate-di-basic in the ethylene-vinyl alcohol layer was 0.68. Another example, 5-layer polymeric structures were prepared consisting of an exterior structural layer of high density polyethylene (15 mils in thickness) adhered by a layer of Plexar adhesive (2 mils) to an interior layer of ethylene-vinyl alcohol (4 mils) adhered by a layer of Plexar (2 mils) to an exterior layer of high density polyethylene (15 mils). The oxygen permeability of the structure containing sodium phosphate-di-basic drying agent in the ethylene-vinyl alcohol layer was less than 0.02, and the oxygen permeability of the control was 0.68. In the five-layer work, the sodium phosphate-di-basic drying agent was heated at a temperature of 250° F. until no further weight loss was observed, prior to admixing the drying agent with ethylene-vinyl alcohol.

Comparative tests were also carried out utilizing calcium chloride ($CaCl_2$), another drying agent which forms hydrates and is within the class of drying agents whose properties are illustrated in FIG. 4. Five-layer structures were prepared, each having an exterior structural layer of high density polyethylene (15 mils) adhered by a layer of Plexar adhesive (2 mils) to an interior layer of ethylene-vinyl alcohol (4 mils) adhered by a layer of Plexar (2 mils) to an exterior layer of high density polyethylene (15 mils). Four such structures were compared. The first was the control and did not contain drying agent in the ethylenevinyl alcohol layer; its oxygen permeability was 0.68. In the second structure, the ethylene-vinyl alcohol layer was modified to consist of a mixture of ninety percent by weight ethylene-vinyl alcohol and ten percent by weight calcium chloride drying agent. The oxygen permeability was about 0.1 or less. In the third structure, the ethylene-vinyl alcohol layer was modified to consist of a mixture of ninety percent by weight ethylene-vinyl alcohol, eight percent by weight calcium chloride and two percent by weight sodium carbonate ($Na_2CO_3$), and the oxygen permeability of this structure was about 0.05 or less. Sodium carbonate was added to neutralize the acidic calcium chloride. In the fourth structure, the ethylene-vinyl alcohol layer was modified to consist of a mixture of ninety percent by weight ethylene-vinyl alcohol, eight percent by weight calcium chloride and two percent by weight calcium stearate, which was coated onto the calcium chloride to aid in dispersing it in the ethylene-vinyl alcohol. The oxygen permeability of this structure was from about 0.15 to about 0.25. In these four structures, the calcium chloride drying agent was heated at a temperature of 250° F. until no further weight loss was observed, prior to mixing it with the ethylene-vinyl alcohol. The multi-layer structures were retorted at 250° F. for two hours, cooled for one day at conditions of room temperature and humidity, and the oxygen permeability was then measured.

Five-layer structures were prepared containing an interior moisture sensitive barrier layer of ethylene-vinyl alcohol in which was admixed and entrapped a drying agent of the class which forms no hydrate. The drying capacity vs. water activity properties of this class of drying agents are illustrated in FIG. 5. The particular drying agents of this class which were utilized were sodium chloride and ammonium chloride. Five-layer structures were prepared having an exterior polymeric structural layer comprising a blend of fifty percent by weight high density polyethylene and fifty percent by weight polypropylene (15 mils) adhered by a layer of Plexar adhesive (2 mils) to an interior moisture sensitive barrier layer of ethylene-vinyl alcohol (3 mils) adhered by a layer of Plexar (2 mils) to an exterior polymeric structural layer comprising a blend of fifty percent by weight high density polyethylene and fifty percent by weight polypropylene (15 mils). In one such structure, the ethylene-vinyl alcohol moisture sensitive barrier layer was modified to consist of a mixture of eighty percent by weight ethylene-vinyl alcohol and twenty percent by weight sodium chloride drying agent; the oxygen permeability was 0.29. In a second, control, structure, the ethylene-vinyl alcohol layer did not contain any drying agent; the oxygen permeability was 0.60. In a third such structure, the ethylene-vinyl alcohol layer was modified to consist of a mixture of eighty percent by weight ethylene-vinyl alcohol and twenty percent by weight ammonium chloride; the oxygen permeability was 0.82. In the control structure, containing no drying agent, the oxygen permeability was 0.60. Prior to incorporating the ammonium chloride into the ethylene-vinyl alcohol of the third structure, the ammonium chloride was heated at 300° F. for 5 hours to dry it. It was allowed to cool and then was admixed with the ethylene-vinyl alcohol material in a Brabender Mixer for three minutes at 400° F.

As in previous comparative tests wherein the desiccant calcium chloride was found to be acidic and to be more effective when employed with an acid neutralizer sodium carbonate in the barrier layer, it was again found that the inclusion of ammonium chloride by itself in the ethylene-vinyl alcohol moisture-sensitive barrier layer of the third structure did not improve the oxygen permeability of the structure relative to the control structure because the ammonium chloride entrapped in the barrier layer material, at the elevated temperatures, here, 400° F., used to form the barrier film and to form the laminate structure, was highly unstable, decomposed, and produced hydrochloric acid. The acid degraded the ethylene-vinyl alcohol barrier layer material and deleteriously affected its resistance to oxygen permeation.

It was found that, as in the case of calcium chloride, resistance to oxygen permeation of the moisture-sensitive layer-containing structure can be improved by the use of a proton-acceptor component substance in conjunction with acid-liberating or producing drying agents in the barrier layer material, to accept protons produced by the drying agent, reduce or neutralize the deleterious effects of the acid and thereby prevent it from significantly degrading the barrier layer's resistance to oxygen permeation. For example, it was found that the inclusion of a proton-acceptor calcium oxide with ammonium chloride in an ethylene-vinyl alcohol moisture-sensitive barrier layer of a five-layer structure improved the structure's resistance to oxygen permeation relative to that of a control. Fourth, fifth and sixth, five-layer structures, here designated A, B and C, were prepared. A barrier layer was prepared by mixing, in finely ground powder form and at room temperature (75° F.), the ethylene-vinyl alcohol moisture-sensitive barrier layer material, calcium oxide and ammonium chloride in the amounts shown in Table IV below. A heated Brabender Mixer was not employed. The mixture was then placed in a platen press and heated and pressed into a film at 400° F. for 5 minutes. The film was 3 mils thick. The barrier layer was then placed between two films each 2 mils thick and made of an adhesive material made by and sold under the trade designation Plexar 102 by Chemplex Company. This three-layer sandwich was then placed between two outer films each 15 mils thick and each comprised of a blend of 50% polypropylene, sold under the trade designation Exxon E612 by The Exxon Corporation and 50% high density polyethylene sold under the trade designation Chemplex 6001, by Chemplex Company. The five-layer sandwich was pressed and heated at 400° F. for 5 minutes to form the five-layer structure designated C in Table IV below.

The five-layer structures designated A and B having the ingredients shown in Table IV, were made by placing ethylene-vinyl alcohol moisture-sensitive barrier films made from powders as described above, between adhesive and structural films made of the aforementioned respective materials, placing each sandwich of five layers of film in a platen press and pressing each sandwich separately at 400° F. for 5 minutes. Structures A, B and C were retorted at 250° F. for two hours, and cooled for one day at room temperature and humidity conditions. Oxygen permeability was then measured.

TABLE IV

| Sample Code | Composition in the Barrier Layer | | | $O_2$ Permeability cc mil 100 in.$^2$ day atm. |
|---|---|---|---|---|
| | EVAL-EPF | CaO | NH$_4$Cl | |
| A | 100% | 0 | 0 | 2.3 ± 0.3 |
| B | 92% | 8% | 0 | 2.0 ± 0.3 |
| C | 84% | 8% | 8% | 1.0 ± 0.3 |

Table IV clearly shows that structure C having the ammonium chloride drying agent and calcium oxide proton-acceptor in the barrier layer provided more than a 50% improved resistance to oxygen permeation over the control structure A. It shows that acid-liberating drying agents such as ammonium chloride can function well as drying agents when used with a proton-acceptor in the barrier layer. Sample B shows that a relatively poor drying agent such as calcium oxide slightly improves the structure's resistance to oxygen permeability.

It has been found to be highly desirable that a proton-acceptor be used with an acid-liberating drying agent such as ammonium chloride in ethylene-vinyl alcohol moisture-sensitive barrier layers, particularly when the layer in the structure in which it is included is subjected to elevated temperatures. Elevated temperatures here means temperatures at which the drying agent evolves acid in an amount which significantly deleteriously affects the oxygen permeability of the ethylene-vinyl alcohol barrier layer for the use intended. As was shown, at a temperature of 400° F., sufficient acid was liberated to adversely affect the barrier properties. It is expected that temperatures of about 375° F. and higher would be considered elevated temperatures for most purposes relative to the subject matter of this invention. Preferably, the elevated heat history of the acid-liberating drying agent in the presence of the ethylene-vinyl alcohol barrier material should be minimized. A proton-acceptor may not be needed if the barrier layer film is made at sufficiently low temperatures wherein little, insignificant, or no acid is liberated.

As a further example, it is thought that if films of ammonium-chloride and ethylene-vinyl alcohol are made at low temperatures, below about 212° F., for example, by casting them from solution, the ammonium-chloride at such temperatures would not evolve acid in amounts which would be considered significantly deleterious to the performance of the ethylene-vinyl alcohol barrier layer material.

A proton-acceptor need not be employed with ammonium chloride when the latter is used as a drying agent in an adhesive or structural layer.

Drying agents, such as bentonite, from the class of drying agents which are insoluble in water, may be incorporated into the ethylene-vinyl alcohol moisture sensitive barrier layer. The drying capacity vs. water activity properties of such drying agents are illustrated in FIG. 7.

Five-layer structures were prepared having an exterior structural layer comprising a blend of fifty percent by weight high density polyethylene and fifty percent by weight polypropylene (15 mils) adhered by a layer of Plexar adhesive (2 mils) to an interior moisture sensitive barrier layer of ethylene-vinyl alcohol (3.3 mils) adhered by a layer of Plexar adhesive (2 mils) to an exterior structural layer comprising a blend of fifty percent by weight high density polyethylene and fifty percent by weight polypropylene (15 mils). In one such structure, the ethylene-vinyl alcohol layer was modified to consist of a mixture of eighty percent by weight ethylene-vinyl alcohol and twenty percent by weight bentonite; the oxygen permeability was 0.25. In a second, control, structure, having no drying agent in the ethylenevinyl alcohol layer, the oxygen permeability was 0.60.

In these structures, the drying agent was admixed with ethylene-vinyl alcohol by placing the required amount of the drying agent and the required amount of pellets of ethylene-vinyl alcohol in the mixing head of a Brabender mixer and admixing those ingredients for three minutes at 400° F. The mixture was allowed to cool to room temperature and, within not more than about two hours, was placed in a press to make a film of the mixture of entrapped drying agent and ethylene-vinyl alcohol. Within not more than about two hours, the film was laminated to the exterior structural layer films by Plexar adhesive. As mentioned, the sodium phosphate-dibasic, calcium chloride and ammonium chloride drying agents were dried, prior to being placed in the mixing head of the Brabender mixer, by heating said drying agent at least 250° F. until no further weight loss was observed. The multi-layer structures were retorted at 250° F. for two hours, cooled for one day at conditions of room temperature and humidity, and the oxygen permeability was then measured.

The following structures illustrate the incorporation of a drying agent in polymeric material forming an exterior structural layer of a multi-layer polymeric structure. Five-layer polymeric structures were prepared cnsisting of an exterior structural layer of high density polyethylene (15 mils) adhered by a layer of Plexar adhesive (2.5 mils) to an interior moisture sensitive barrier layer of ethylene-vinyl alcohol (1.6 mils) adhered by a layer of Plexar (2.5 mils) to an exterior layer of high density polyethylene (15 mils). Four such structures were prepared, retorted at 250° F. for two hours, cooled for one day at conditions of room temperature and humidity and the oxygen permeability was then measured. The first structure was the control and did not contain drying agent; its oxygen permeability was from about 1.6 to about 2.5. In the second structure, each exterior high density polyethylene polymer layer was modified to consist of a mixture of ninety-five percent by weight high density polyethylene and five percent by weight calcium chloride drying agent; the oxygen permeability was less than 0.02. In the third structure, each exterior polymer layer was modified to consist of a mixture of ninety percent by weight high density polyethylene and ten percent by weight calcium chloride; the oxygen permeability was less than 0.02. In the fourth structure, each exterior polymer layer was modified to consist of a mixture of eighty percent by weight high density polyethylene and twenty percent by weight calcium chloride; the oxygen permeability was less than 0.02.

The following structures illustrate the incorporation of drying agents of the class illustrated in FIG. 5 in a polymer forming an exterior structural layer of a multilayer polymeric structure. Five-layer polymeric structures were prepared consisting of an exterior structural layer comprising a blend of fifty percent by weight high density polyethylene and fifty percent by weight polypropylene (15 mils) adhered by a layer of Plexar adhesive (2 mils) to an interior moisture sensitive barrier layer of ethylene-vinyl alcohol (3 mils) adhered by a layer of Plexar adhesive (2 mils) to an exterior structural layer of polymer comprising a blend of fifty percent by weight high density polyethylene and fifty percent by weight polypropylene (15 mils). Three such structures were prepared, retorted at 250° F. for two hours, cooled for one day at conditions of room temperature and humidity, and the oxygen permeability was then measured. In the first, control structure, containing no drying agent, the oxygen permeability was 0.6. In the second structure, each exterior polymer blend layer was modified to consist of a mixture of eighty percent by weight of the blend and twenty percent by weight of ammonium chloride drying agent; oxygen permeability was less than about 0.02. In the third structure, each exterior polymer blend layer was modified to consist of a mixture of eighty percent by weight of the blend and twenty percent by weight of sodium chloride drying agent; oxygen permeability was 0.04.

The following structures illustrate the incorporation of a drying agent in a layer of a multi-layer structure which is not immediately proximate to the moisture sensitive barrier layer and which is not an exterior layer of the structure. Seven-layer polymeric structures were prepared. Each structure comprised an interior moisture sensitive barrier layer of ethylene-vinyl alcohol (1.8 mils) and exterior structural polymer layers of high density polyethylene (each structural layer was 15 mils thick). On each side of the ethylene-vinyl alcohol layer, two additional layers were interposed between the interior ethylene-vinyl alcohol layer and the exterior high density polyethylene polymer layer. Each of the seven-layer structures was retorted at 250° F. for two hours, cooled for one day at conditions of room temperature and humidity, and the oxygen permeability was then measured. The particular structures and their oxygen permeability are as follows. In the first seven-layer structure, an exterior structural layer of high density polyethylene (15 mils) was adhered by a layer consisting of a mixture eighty percent by weight Plexar adhesive and twenty percent by weight ammonium chloride drying agent (2.5 mils) to a layer of high density polyethylene (1.8 mil) adhered to an interior moisture sensitive barrier layer of ethylene-vinyl alcohol (1.8 mils) adhered to a layer of high density polyethylene (1.8 mil) adhered by a layer consisting of a mixture of eighty percent by weight Plexar adhesive and twenty percent by weight ammonium chloride drying agent (2.5 mils) to an exterior structural layer of high density polyethylene (15 mils); oxygen permeability was less than about 0.02. A second seven-layer structure was prepared consisting of an exterior structural layer of high density polyethylene (15 mils) adhered by a layer comprising a mixture of eighty percent by weight Plexar adhesive and twenty percent by weight ammonium chloride drying agent (2.5 mils) to a layer of Plexar adhesive (1.8 mil) adhered to an interior moisture sensitive barrier layer of ethylene-vinyl alcohol (1.8 mils) adhered by a layer of Plexar adhesive (1.8 mil) to a layer comprising a mixture of of eighty percent by weight Plexar adhesive and twenty percent by weight ammonium chloride drying agent (2.5 mils) adhered to an exterior structural layer of high density polyethylene (15 mils); oxygen permeability was 0.028. In these two, above-described structures the drying agent was incorporated in an adhesive layer which was not immediately proximate to the interior moisture sensitive barrier layer. A third seven-layer polymeric structure was prepared consisting of an exterior structural layer of high density polyethylene (15 mils) adhered to a layer comprising a mixture of eighty percent by weight high density polyethylene and twenty percent by weight ammonium chloride drying agent (2.5 mils) adhered to a layer of high density polyethylene (1.8 mil) adhered to an interior moisture sensitive barrier layer of ethylene-vinyl alcohol (1.8 mils) adhered to a layer of high density polyethylene (1.8 mil) adhered to a layer comprising a mixture of eighty percent by weight high density polyethylene and twenty percent by weight ammonium chloride drying agent (2.5 mils) adhered to an exterior structural layer of high density polyethylene (15 mils); oxygen permeability was 0.029. A fourth seven-layer polymeric structure was prepared consisting of an exterior structural layer of high density polyethylene (15 mils) adhered to a layer comprising a mixture of eighty percent by weight high density polyethylene and twenty percent by weight ammonium chloride drying agent (2.5 mils) adhered by a layer of Plexar adhesive (1.8 mil) to an interior moisture sensitive barrier layer of ethylene-vinyl alocohol (1.8 mils) adhered by a layer of Plexar adhesive (1.8 mil) to a layer comprising a mixture of eighty percent by weight high density polyethylene and twenty percent by weight ammonium chloride drying agent (2.5 mils) adhered to an exterior structural layer of high density polyethylene (15 mils); oxygen permeability was 0.04. In these latter two structures, the drying agent was incorporated into a layer of structural polymer which was not an exterior layer of the multi-layer structure. In a control structure, consisting of an exterior structural layer of high density polyethylene (15 mils) adhered by a layer of plexar adhesive (1.8 mil) to an interior moisture sensitive barrier layer of ethylene-vinyl alcohol (2 mils) adhered by a layer of Plexar adhesive (1.8 mil) to an exterior structural layer of high density polyethylene (15 mils), the oxygen permeability was from about 1.6 to about 2.5.

The following structures illustrate the incorporation, into a polymer forming an exterior structural layer of a multi-layer polymeric structure, of a drying agent which absorbs water at all relative humidities and is water soluble and is within the class of drying agents whose drying capacity vs. water activity properties are illustrated in FIG. 6. Five-layer polymeric structures were prepared consisting of an exterior structural layer comprising a blend of fifty percent by weight high density polyethylene and fifty percent by weight polypropylene (15 mils) adhered by a layer of Plexar adhesive (2 mils) to an interior moisture sensitive barrier layer of ethylene-vinyl alcohol (3.4 mils) adhered by a layer of Plexar adhesive (2 mils) to an exterior structural layer comprising a blend of fifty percent by weight high density polyethylene and fifty percent by weight polypropylene (15 mils). Two such structures were prepared, retorted at 250° F. for two hours, cooled for one day at conditions of room temperature and humidity and the oxygen permeability was then measured. The first structure did not contain drying agent; oxygen permeability was 0.6. In the second structure, each of the exterior structural layers was modified to consist of a mixture containing eighty percent by weight of the polyethylene-polypropylene blend and twenty percent by weight of entrapped sucrose drying agent; oxygen permeability was 0.12.

The following structure illustrates the incorporation of a FIG. 6 class drying agent, sucrose, in a layer which is not immediately proximate to the interior moisture sensitive barrier layer and which is not an exterior layer of the multi-layer structure. Seven-layer polymeric structures were prepared consisting of an exterior structural layer of high density polyethylene (15 mils) adhered by a layer of Plexar adhesive (2.5 mils) to a layer of high density polyethylene (2 mils) adhered to an interior moisture sensitive barrier layer of ethylene-vinyl alcohol (1.5 mils) adhered to a layer of high density polyethylene (2 mils) adhered by a layer of Plexar adhesive (2.5 mils) to an exterior structural layer of high density polyethylene (15 mils). Five such structures were prepared, retorted at 250° F. for two hours, cooled for one day at conditions of room temperature and humidity and the oxygen permeability was then measured. In the first, control, structure, containing no drying agent, oxygen permeability was from about 1.6 to about 2.5. In the second structure, each Plexar layer was modified to consist of a mixture of eighty-five percent by weight Plexar and fifteen percent by weight sucrose drying agent; oxygen permeability was 0.035. In a third such structure, each of the Plexar layers was modified to consist of a mixture of eighty percent by weight Plexar and twenty percent by weight sucrose drying agent; oxygen permeability was 0.025. In a fourth such structure, each of the Plexar layers was modified to consist of a mixture of seventy-five percent by weight Plexar and twenty-five percent by weight surcrose drying agent; oxygen permeability was less than about 0.02. In the fifth such structure, each of the Plexar layers was modified to consist of a mixture of seventy percent by weight Plexar and thirty percent by weight sucrose drying agent; oxygen permeability was less than about 0.02.

The following structures illustrate the incorporation, in polymeric material forming an exterior structural layer of a multi-layer polymeric structure, of a drying agent of the class whose drying capacity vs. water activity properties are illustrated in FIG. 7. Five-layer polymeric structures were prepared consisting of an exterior structural layer of high density polyethylene (15 mils) adhered by a layer of Plexar adhesive (2.5 mils) to an interior moisture sensitive barrier layer of ethylene-vinyl alcohol (1.5 mils) adhered by a layer of Plexar adhesive (2.5 mils) to an exterior structural layer of high density polyethylene (15 mils). In one such structure, the control, containing no drying agent, the oxygen permeability was from about 1.6 to about 2.5. In the second such structure, each of the exterior structural layers was modified to consist of a mixture of eighty percent by weight high density polyethylene and twenty percent by weight bentonite drying agent; oxygen permeability was 0.8. Five-layer polymeric structures were prepared consisting of an exterior structural layer comprised of a blend of fifty percent by weight high density polyethylene and fifty percent by weight polypropylene (15 mils) adhered by a layer of Plexar adhesive (2 mils) to an interior moisture sensitive barrier layer of ethylene-vinyl alcohol (3.4 mils) adhered by a layer of Plexar adhesive (2 mils) to an exterior structural layer comprising a blend of fifty percent by weight high density polyethylene and fifty percent by weight polypropylene (15 mils). In one such structure, the control, containing no drying agent, the oxygen permeability was 0.6. In a second such structure, each of the exterior structural layers was modified to consist of a mixture of eighty percent by weight of the polyethylene-polypropylene blend and twenty percent by weight of bentonite drying agent; oxygen permeability was 0.09. Each of the four structures described above was prepared, retorted at 250° F. for two hours, cooled for one day at conditions of room temperature and humidity and the oxygen permeability was then measured.

While the foregoing specification is written in terms of multi-layer polymeric structures for food packaging, it is apparent that the invention is applicable to multi-layer structures for other purposes where maintenance of barrier properties of a moisture sensitive layer is important.

Experiments have shown that barrier polymers other than EVOH, such as polyvinyl alcohol and Saran, when subjected to retorting, benefit from the presence of drying agents.

What is claimed is:

1. In a multi-layer polymer structure having a layer of a moisture-sensitive oxygen barrier polymer and exterior layers of structural polymer, the improvement which comprises the incorporation of an ammonium chloride drying agent entrapped in the moisture-sensitive oxygen barrier layer.

2. In a multi-layer polymer structure having a layer of a moisture-sensitive oxygen barrier polymer, and exterior layers of structural polymer, the improvement which comprises the incorporation of a drying agent which liberates acid when heated to an elevated temperature, and a proton-acceptor substance entrapped in the moisture-sensitive oxygen barrier layer.

3. The multi-layer structure of claim 2 wherein the drying agent is ammonium chloride.

4. The multi-layer structure of claim 3 wherein the proton-acceptor is calcium oxide.

5. The multi-layer structure of claim 2 or 4 wherein the moisture-sensitive oxygen barrier polymer layer is an interior layer of the structure.

6. In a multi-layer polymer structure having a layer of moisture-sensitive oxygen barrier polymer, and exterior layers of a structural polymer, the improvement which comprises the incorporation of an ammonium chloride drying agent and a proton-acceptor substance entrapped in the moisture-sensitive oxygen barrier polymer.

7. The multi-layer structure of claim 6 wherein the proton-acceptor substance is calcium oxide.

* * * * *